No. 674,352. Patented May 14, 1901.
G. W. BEAM.
CONVEYER FOR GRAIN HARVESTERS.
(Application filed Sept. 17, 1900.)
(No Model.) 4 Sheets—Sheet 1.
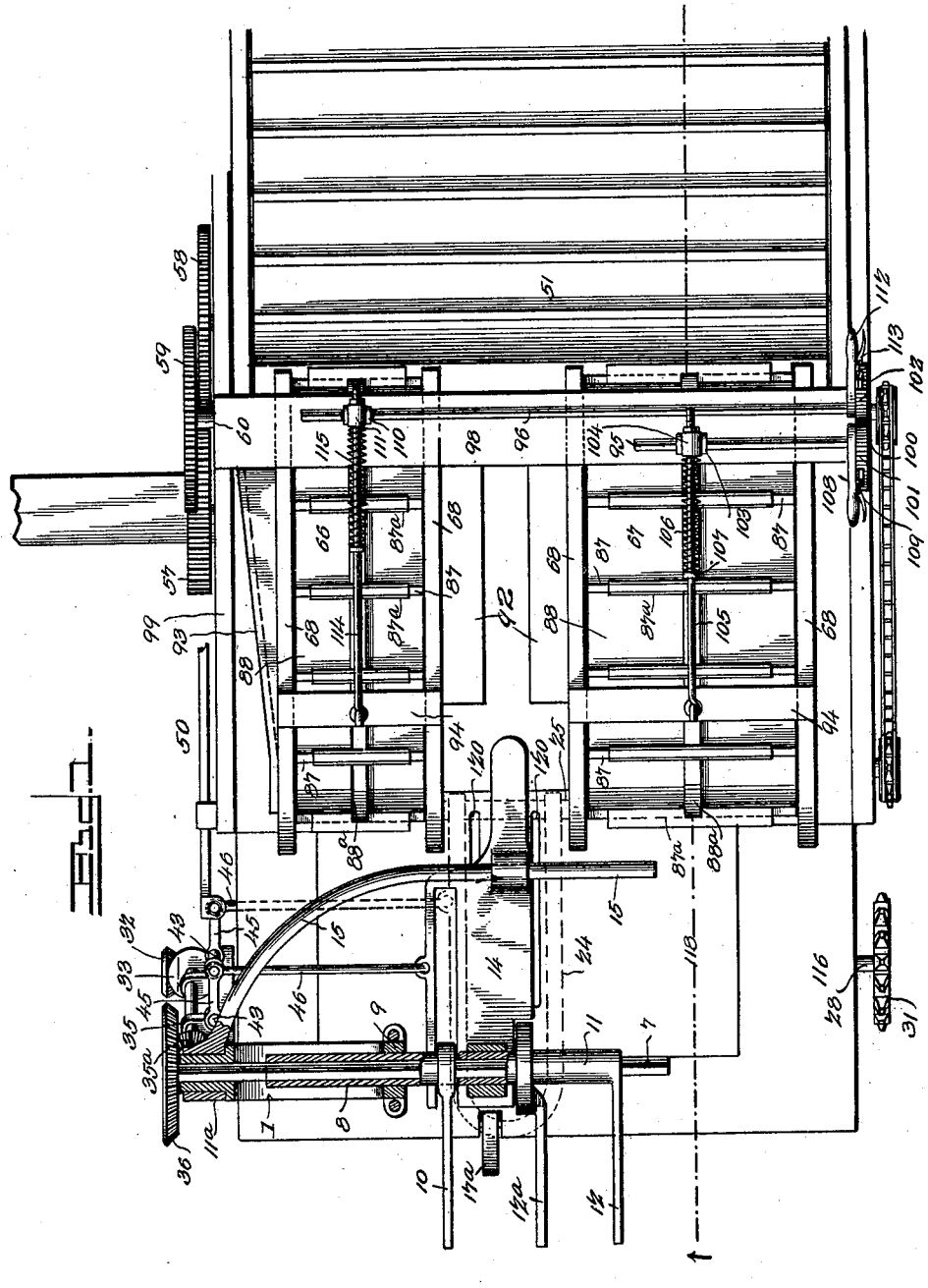

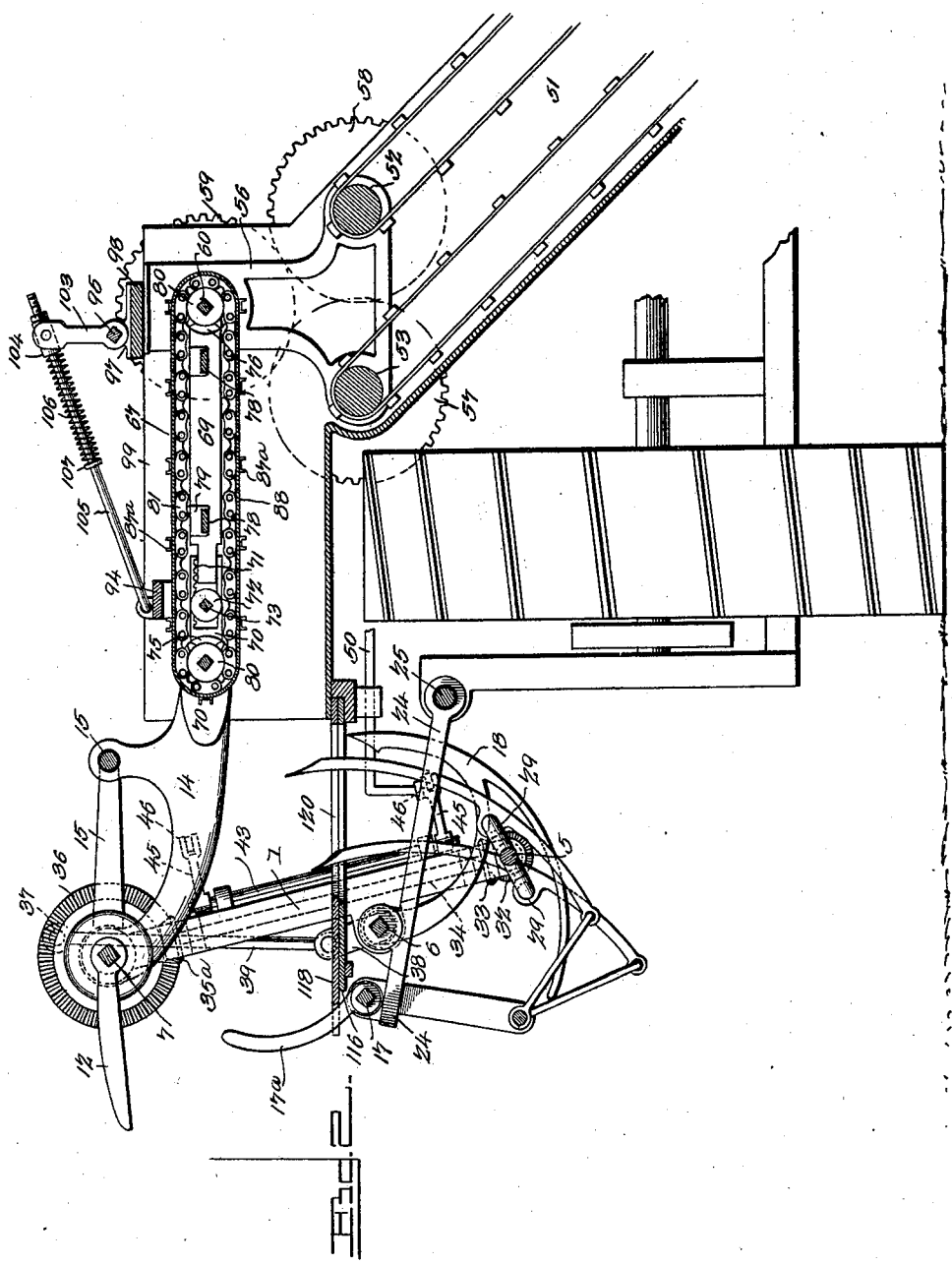

No. 674,352. Patented May 14, 1901.
G. W. BEAM.
CONVEYER FOR GRAIN HARVESTERS.
(Application filed Sept. 17, 1900.)
(No Model.) 4 Sheets—Sheet 3.
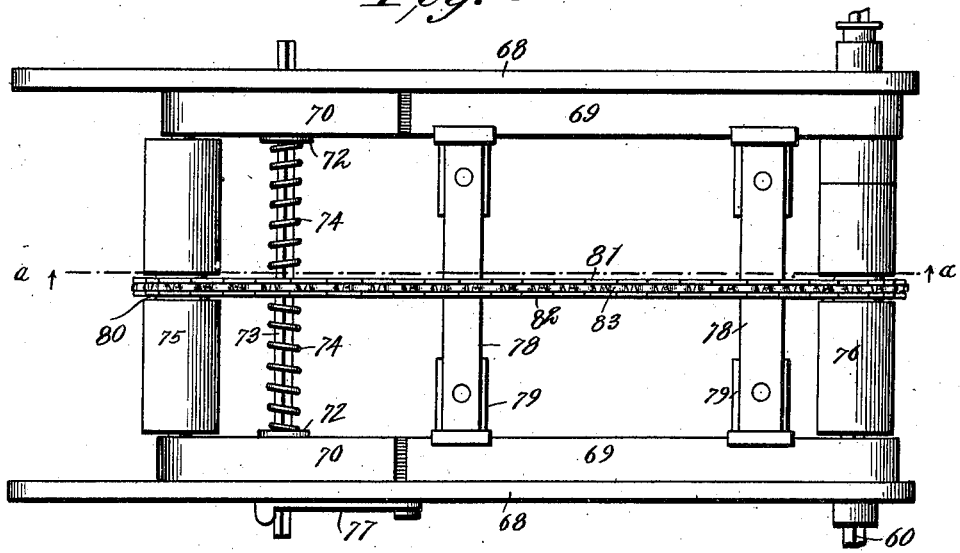
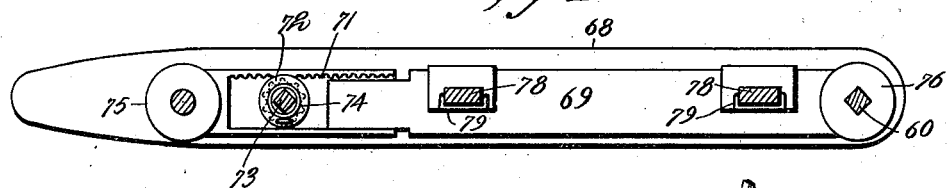

No. 674,352. Patented May 14, 1901.
G. W. BEAM.
CONVEYER FOR GRAIN HARVESTERS.
(Application filed Sept. 17, 1900.)
(No Model.) 4 Sheets—Sheet 4.
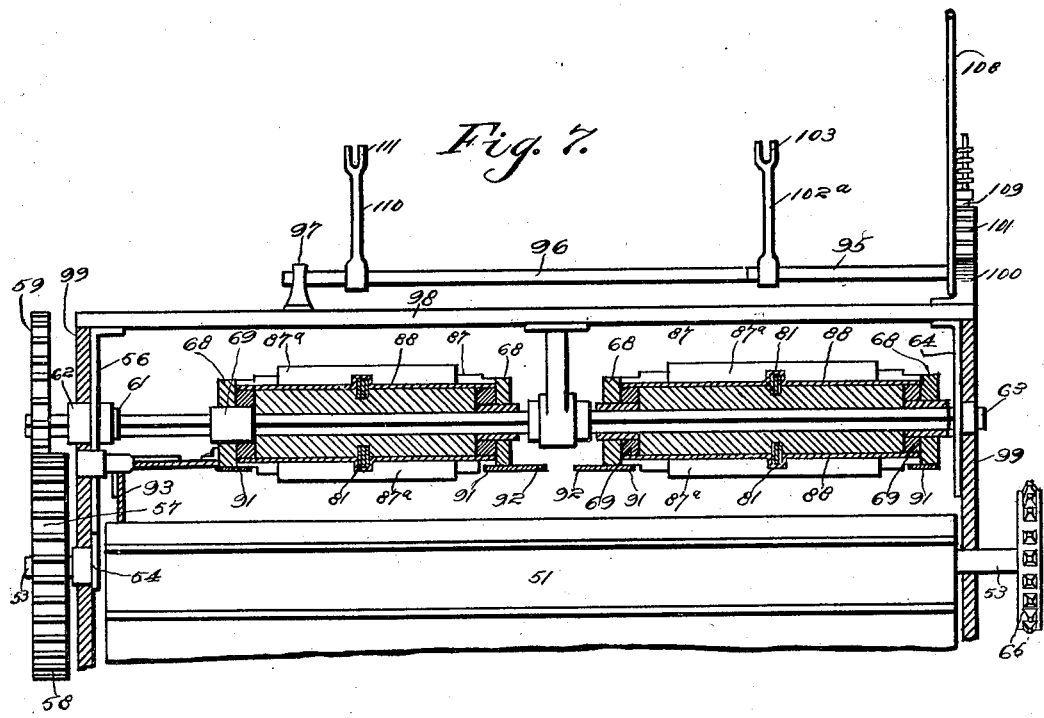
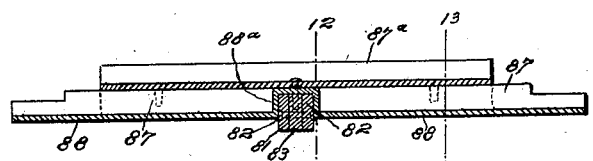
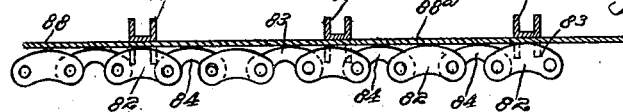
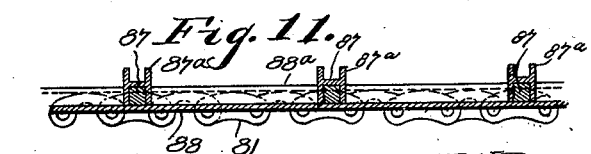
Witnesses
G. W. Beam, Inventor.
Attorneys

UNITED STATES PATENT OFFICE.

GEORGE WASHINGTON BEAM, OF ROBINSON, ILLINOIS.

CONVEYER FOR GRAIN-HARVESTERS.

SPECIFICATION forming part of Letters Patent No. 674,352, dated May 14, 1901.

Application filed September 17, 1900. Serial No. 30,350. (No model.)

*To all whom it may concern:*

Be it known that I, GEORGE WASHINGTON BEAM, a citizen of the United States, residing at Robinson, in the county of Crawford and State of Illinois, have invented a new and useful Conveyer for Grain-Harvesters, of which the following is a specification.

My invention relates to grain harvesting and binding machines, and has special reference to the elevating mechanism by which the grain is taken from the platform-carrier, elevated, and delivered to the binding mechanism.

One object of my present invention is to effect improvements in the construction of the independent delivery-carriers shown and described in Letters Patent of the United States No. 637,918, which were granted to me November 28, 1899, which convey the grain from the elevator-aprons to the binding mechanism.

A further object of my invention is to effect improvements in the means for adjusting said independent delivery-carriers.

In the accompanying drawings, Figure 1 is a top plan view of a portion of a harvester provided with my improved independent delivery-carriers. Fig. 2 is a sectional view of the same, taken on a plane indicated by the line *b b* of Fig. 1. Fig. 3 is a top plan view illustrating the construction of one of the independent carrier-frames. Fig. 4 is a detail sectional view of the same, taken on the line *a a* of Fig. 3. Fig. 5 is a detail perspective view of the mechanism for adjusting said independent carrier-frames. Fig. 6 is a detail view of the spring-actuated rack-and-pinion mechanism to automatically adjust one of the independent carrier-frames in length. Fig. 7 is a transverse sectional view illustrating the relative arrangement of the elevator-aprons and of my improved independent carriers. Fig. 8 is a detail transverse sectional view of the apron of one of the independent carriers, together with the sprocket-chain, a channeled iron, and a pair of the abutting bars, which constitute one of the cross-bars on said apron. Fig. 9 is a detail top plan view of the said chain. Fig. 10 is a detail sectional view taken on a plane indicated by the line 12 12 of Fig. 8. Fig. 11 is a similar view taken on a plane indicated by the line 13 13 of Fig. 8.

In the embodiment of my invention the harvester is provided with a binding mechanism which may be of suitable construction.

The elevator-aprons, which carry the grain which is cut to the grain-deck 116, the elevator-frame 51, and the operating mechanism for the elevator-aprons are as described in the Letters Patent hereinbefore mentioned.

I will now describe my improvements in the independent carriers for conveying the grain from the elevating-aprons to the binding mechanism and the means for adjusting said independent carriers.

The shafts of the rollers 52 53 at the upper portions of said elevator-aprons are journaled at their front ends in bearings formed in a bracket 56. Said rollers are provided at the front ends of their shafts with gears 57 58, which engage each other. The gear 57 is wider than the gear 58 and is engaged by a gear 59 on the front end of the shaft 60, which is angular in cross-section and is provided with a bushing 61 near its front end which is journaled in a bearing 62 in the bracket 56, the rear end of said shaft being journaled in a bearing 63, with which a bracket 64 is provided. Hence power is communicated from the elevator-rollers to the shaft 60. The shaft 53 has at its rear end a sprocket-wheel 65, which is driven by a suitable sprocket-chain from a suitable counter-shaft with which the machine is provided. Said sprocket-chain and shaft are not shown, as the same are well understood and are not of my invention.

The independent carrier-frames 66 67 are alike in construction, and I will now describe one of them.

The parallel side boards 68 are provided on their inner sides with bars 69, each of which has at its outer end a longitudinally-extensible section 70. The outer ends of the bars 69 are rabbeted, as shown, to form guides and supports for the extensible sections 70. The latter are provided with racks 71, which are engaged by pinions 72 on a shaft 73, which is provided with bushings at its ends that rotate in bearings in the side boards 68. In the embodiment of my invention here shown the shaft 73 is angular in cross-section, and on the same are right and left hand coil-springs 74. The inner ends of the said springs are secured to the said shaft, and the outer ends of the said springs are secured to said pinions. Initially by turning the shaft 73 by means of a wrench or a suitable crank the springs 74 are wound up to the requisite tension, the shaft being then locked against reverse rotation by a suitable dog 77. The springs in tending to uncoil rotate the pinions, thereby moving the sections 70 outwardly on the bars 69, thereby increasing the distance between the roller 75, which is journaled in the sections 70, and the roller 76, which is sleeved on the shaft 60 and rotated thereby. Hence the endless chains, hereinafter described, which connect the said rollers together are tightened, as will be understood, and the lower lead thereof is adapted to yield to pressure exerted on it by grain under the independent carriers and to automatically reassume its normal position when the pressure is reduced. It will be understood that the central openings in the pinions 72, through which the square shaft 73 passes, are round, so that said pinions and shaft are adapted to rotate independently of each other. The spring may, however, be dispensed with, in which event the pinions should turn with the shaft. When the springs are dispensed with, the pinions, if the shaft is square in cross-section, should have their openings of corresponding shape, or said shaft and pinions may be of any suitable construction and the pinions secured to the shaft by any suitable means, as by a key or the like, as will be understood. The bars 69 are connected together and braced by cross-bars 78, the ends of which are bolted to brackets 79, which are secured on the inner sides of the bars 69. In the central portion of each roller 75 76 is a sprocket-wheel 80, the teeth of which engage alternate links of an endless sprocket-chain 81, which serves to convey power from the shaft 60 or roller 76 to the roller 75, so that both of said rollers are positively driven and at a uniform rate of speed, the said rollers and the said sprocket-wheels 80 being uniform in size, respectively. The endless sprocket-chain 81 comprises the two-part links 82 and the one-part links 83. Said links 83 have the notches 84, which are engaged by the teeth of the sprocket-wheels 80, and the said two-part links are provided on their proximate sides with abutting offsets or shoulders 85, in certain of which at appropriate distances apart are openings for bolts 86, which serve to secure transversely-disposed channeled irons 87ª to said chain. Bars 87 are disposed and secured in the inner sides of said channeled irons, the inner ends of said bars abutting against the sides of the chain, as shown in Fig. 8. The endless carrier-apron 88 connects the rollers 75 76. The channeled irons and the bars 87 bear on the outer sides of said endless carrier-apron, the central portion of the latter being rigid over the said chain, as at 88ª. It will be understood that said apron is positively driven under all conditions, and hence cannot slip on the rollers 75 76. Said channeled irons, together with said bars, constitute cross-slats on the outer sides of the apron. It will be observed that the said cross-slats are adapted to engage the grain as it is delivered from the elevator-aprons and sweep the same outward to the binding mechanism. Shields 91, which are of the form shown, are secured under the side boards 68 of the frames of the independent carriers and overlap the spaces between the sides of the aprons 88 and said side boards and serve to prevent the grain from working within the aprons. Shields 92, secured to the frames of the independent carriers, close the spaces between the same on the lower sides thereon. Secured to the front side of the frame of the front carrier 66 and disposed below said carrier is a butt-evener 93. The side boards of each carrier-frame are connected on their upper sides near their outer ends by a crossed bar 94. A pair of rock-shafts 95 96 are journaled in suitable bearings 97 on a cross-bar 98, which connects the front and rear sides of the elevator-frame 99. The rear ends of the said rock-shafts 95 are journaled in bearings 100, which are bolted on the rear end of said cross-bar 98 and are provided, respectively, with segment-racks 101 102. The rock-shaft 95 is provided with a rock-arm 102ª, having a fork 103 at its upper end in which is pivoted a sleeve 104. A rod 105 is attached at its outer end to the cross-bar 94 of carrier 67, and its rear end is supported and adapted to slide longitudinally in said sleeve 104. A coiled extensile spring 106 on the said rod 105 bears between said sleeve and a cross-pin or other stop 107 on said rod, said spring normally tending to move said rod outward and to thereby bear downward on the outer end of the carrier-frame to increase the friction between the apron and the grain, and thereby prevent the apron from slipping over the grain without moving the same to the binding mechanism. The said shaft 95 is further provided with a lever 108, which has a spring-pressed dog 109, that engages the segmental rack 101 by means of said lever. Rock-shaft 95 may be partly turned in order to adjust the outer end of carrier 67 vertically as may be required to increase or diminish the pressure thereof on the grain, and hence cause the same to move the grain with increased or decreased rapidity, as may be required. The shaft 96 is provided with a rock-arm 110, sleeve 111, lever 112, and locking-dog 113 to engage segmental rack 102, and a rod 114 connects said sleeve 111 with the cross-bar 94 of the frame of the front independent carrier 66. Said parts 110 111 112 113 114 and spring 115 on rod 114 are identical in construction and operation with the corresponding parts hereinbefore described in connection with the shaft 95. Hence it will be understood that the independent carriers 66 67 are provided with means whereby they may be adjusted independently of each other to increase or decrease their frictional contact with the butts and heads of the grain, and hence they may be so regulated as to even the grain under all conditions, dispose the grain at right angles to the binding mechanism, and deliver the grain thereto in appropriate quantities to make gavels which are uniform in size. The frames of the independent carriers being adapted to be lengthened and shortened, as hereinbefore described, the chains 81 may be under all conditions kept at the required tension to positively convey power from the inner rollers to the outer rollers and to the endless conveying-aprons.

The breastplate 14 is extended so that its inner end is disposed in the space between the independent carriers, which space in advance of said breastplate is closed by the shields 92.

Having thus described my invention, I claim—

1. In a carrier of the class described, the combination with rollers and sprocket-wheels revoluble therewith, of an endless traveling sprocket-chain connecting said sprocket-wheels, an endless traveling apron connecting said rollers and disposed without said sprocket-chain, and cross-bars, connected to said chain and bearing on the outer side of the said apron, substantially as described.

2. In a carrier of the class described, the combination with driving and supporting rollers and sprocket-wheels, of an endless sprocket-chain connecting said sprocket-wheels, an endless traveling carrier-apron connecting said rollers, disposed on the outer sides of said chain and ridged to partly envelop the same, and cross-bars connected to said sprocket-chain, bearing on the outer sides of said apron, and abutting against the said sprocket-chain, substantially as described.

3. In a carrier of the class described, the combination of a frame, rollers journaled therein, sprocket-wheels revoluble with said rollers, an endless traveling sprocket-chain connecting said sprocket-wheels, an endless traveling apron connecting said rollers, bearing on the outer sides of said chain, and ridged to partially envelop the same, channeled irons disposed transversely on said apron, on the outer sides thereof, secured to said chain, and thereby securing said apron thereto, and bars in said channeled irons abutting against the sides of said chain, substantially as described.

4. In a carrier of the class described, a frame having side boards provided with longitudinally-movable sections having racks, a roller in fixed bearings in said side boards, an adjustable roller journaled in said movable sections, a shaft in fixed bearings in said side boards, pinions loose on said shaft and engaging said racks, springs connecting said shaft and pinions, to rotate the latter independently of said shaft, a stop for said shaft, and an endless traveling element connecting said rollers, all in combination, substantially as described.

In testimony that I claim the foregoing as my own I have hereto affixed my signature in the presence of two witnesses.

GEORGE WASHINGTON BEAM.

Witnesses:
C. S. JONES,
E. E. LINDSAY.